US012747104B2

(12) United States Patent
Theron

(10) Patent No.: US 12,747,104 B2
(45) Date of Patent: Sep. 29, 2026

(54) AUTOMATED STORAGE SYSTEM AND A METHOD THEREOF TECHNOLOGICAL FIELD

(71) Applicant: Hand Held Products, Inc., Charlotte, NC (US)

(72) Inventor: Quinton Eduard Theron, Charlotte, NC (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 290 days.

(21) Appl. No.: 18/677,344

(22) Filed: May 29, 2024

(65) Prior Publication Data

US 2025/0368434 A1 Dec. 4, 2025

(51) Int. Cl.
*B65G 1/10* (2006.01)
*B25J 5/02* (2006.01)
(Continued)

(52) U.S. Cl.
CPC *B65G 1/10* (2013.01); *B25J 5/02* (2013.01); *B25J 9/0018* (2013.01);
(Continued)

(58) Field of Classification Search
CPC .......... B65G 1/10; B65G 1/0435; B65G 1/04; B65G 1/0464; B65G 2203/0216;
(Continued)

(56) References Cited

U.S. PATENT DOCUMENTS 5,671,362 A * 9/1997 Cowe ........................ G07F 7/00 340/568.1
9,663,293 B2 5/2017 Wurman et al.
(Continued)

FOREIGN PATENT DOCUMENTS

DE 202004004620 U1 * 8/2004 .............. B66F 9/141
JP H09-315521 A 12/1997
(Continued)

OTHER PUBLICATIONS

Extended European Search Report Mailed on Oct. 21, 2025 for EP Application No. 25177847, 6 page(s).
(Continued)

*Primary Examiner* — Thomas Randazzo
(74) *Attorney, Agent, or Firm* — Alston & Bird LLP

(57) ABSTRACT

An automated storage system is disclosed. The automatic storage system comprises a storage unit that comprises a pair of racks and a pair of tracks. Each rack having a plurality of shelves configured to store one or more objects, and a pair of tracks coupled, directly or indirectly, to the pair of racks. Each sensor of a plurality of sensors is configured to determine a status of a respective shelf. At least one movable shelf is configured to be positioned within an opening of the storage unit. At least one robotic unit is movably coupled to the pair of tracks and comprises at least one inverted robotic arm. At least one processor is configured to control the at least one inverted robotic arm to place the objects from the at least one movable shelf to a corresponding shelf, based at least on the status of each shelf.

20 Claims, 11 Drawing Sheets

(51) Int. Cl.

| | |
|---|---|
| ***B25J 9/00*** | (2006.01) |
| ***B25J 15/06*** | (2006.01) |
| ***B65G 1/04*** | (2006.01) |
| ***B65G 1/06*** | (2006.01) |
| ***G06Q 10/087*** | (2023.01) |

(52) U.S. Cl.
CPC ............ *B25J 15/0616* (2013.01); *B65G 1/04* (2013.01); *B65G 1/0435* (2013.01); *B65G 1/0464* (2013.01); *G06Q 10/087* (2013.01); *B65G 2203/0216* (2013.01); *B65G 2203/044* (2013.01); *B65G 2203/046* (2013.01)

(58) Field of Classification Search
CPC ........ B65G 2203/044; B65G 2203/046; B65G 1/1373; B65G 47/914; B25J 5/02; B25J 9/0018; B25J 15/0616; G06Q 10/087
See application file for complete search history.

(56) References Cited

U.S. PATENT DOCUMENTS

| | | | | |
|---|---|---|---|---|
| 10,137,566 | B2 | 11/2018 | Bastian, II et al. | |
| 10,176,454 | B2 * | 1/2019 | Jones | G06F 1/1632 |
| 12,421,038 | B2 * | 9/2025 | Salichs | B65G 1/06 |
| 2014/0193227 | A1 | 7/2014 | Winkler | |
| 2018/0341908 | A1 | 11/2018 | Lert, Jr. et al. | |
| 2019/0116992 | A1 * | 4/2019 | Mikhailov | A47F 1/04 |
| 2020/0002094 | A1 * | 1/2020 | Schedlbauer | B65G 1/1375 |
| 2020/0062503 | A1 | 2/2020 | Lisso | |
| 2021/0133835 | A1 * | 5/2021 | Gu | G06Q 10/08 |
| 2021/0380341 | A1 | 12/2021 | Dugat | |
| 2022/0219904 | A1 | 7/2022 | Lert, Jr. et al. | |
| 2025/0270044 | A1 * | 8/2025 | Li | G06Q 10/087 |
| 2025/0272651 | A1 * | 8/2025 | Schwarz | G06Q 10/08 |

FOREIGN PATENT DOCUMENTS

| | | | | |
|---|---|---|---|---|
| JP | H1191907 A * | 4/1999 | | B65G 1/04 |
| JP | 3669057 B2 | 7/2005 | | |
| WO | WO-2020102900 A1 * | 5/2020 | | B25J 18/04 |

OTHER PUBLICATIONS

Honeywell Intelligrated, "Autonomous Mobile Robot (AMR) Pallet Conveyance", posted Jun. 4, 2022, viewed on the Internet at https://www.youtube.com/watch?v=GQRbDLDcniY on Jan. 31, 2025, 1 page.

Honeywell International Inc, "AS/RS (Automated Storage and Retrieval Systems)", copyright 2025, retrieved from the Internet at https://automation.honeywell.com/us/en/products/warehouse-automation/solutions-by-technology/asrs-systems on Feb. 5, 2025, 3 pages.

Honeywell International Inc, "Momentum Warehouse Automation Software", copyright 2025, retrieved from the Internet at https://automation.honeywell.com/GB/en/software/automation on Feb. 5, 2025, 9 pages.

Intention to grant Mailed on Jul. 7, 2026 for EP Application No. 25177847, 6 page(s).

* cited by examiner

AUTOMATED STORAGE SYSTEM AND A METHOD THEREOF TECHNOLOGICAL FIELD

TECHNOLOGICAL FIELD

Example embodiments of the present disclosure relate generally to storage systems, and more particularly, to an automated storage system.

BACKGROUND

Within a storage system of grocery stores, retail stores, shopping malls, or warehouses, stockout or out-of-stock (OOS) occurs when a specific product's inventory is exhausted. In retail, stockout refers to a product being unavailable on a store shelf but potentially accessible at another point in a supply chain. Missing, misplaced, mislabeled, and unorganized stock at shelf level contribute to significant loss of sales for retailers. Stock out not only contributes to loss of sales but also negatively impacts customer experience and reduces customer loyalty for the retailers. Stockout can be caused by many different factors, but predominantly happens in-store and on the shelf level. Poor or slow shelf replenishment is one of the main factor of stockout in retail settings. The frequency of stockout can be reduced by doing physical inventory counts; however, physical inventory counts can be time-consuming, prone to human error, and can interfere with the customer experience.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a summary of some example embodiments to provide a basic understanding of some aspects of the present disclosure. This summary is not an extensive overview and is intended to neither identify key or critical elements nor delineate the scope of such elements. It will also be appreciated that the scope of the disclosure encompasses many potential embodiments in addition to those here summarized, some of which will be further described in the detailed description that is presented later.

In an example embodiment, an automated storage system is disclosed. The automated storage system comprising a storage unit having an opening on at least one end of the storage unit. The storage unit comprises a pair of racks, each rack having a plurality of shelves. Each of the plurality of shelves are configured to store one or more objects. Further, the storage unit comprises a pair of tracks coupled, directly or indirectly, to the pair of racks. Further, the automated storage system comprises a plurality of sensors, each sensor installed in proximity to or within each of the plurality of shelves. Each sensor is configured to determine a status of a respective shelf of the plurality of shelves. Further, the automated storage system comprises at least one movable shelf configured to be positioned within the opening of the storage unit and comprising a plurality of trays configured to store the one or more objects. Further, the automated storage system comprises at least one robotic unit movably coupled to the pair of tracks and comprising at least one inverted robotic arm. Further, at least one processor is communicatively coupled to the plurality of sensors. The at least one processor is configured to control the at least one inverted robotic arm to place the one or more objects from the at least one movable shelf to a corresponding shelf of the plurality of shelves, based at least on the status of each shelf of the plurality of shelves.

In some embodiments, each rack of the pair of racks corresponds to a double sided rack that is configured to store the one or more objects at a front portion and a rear portion of the double sided rack. The front portion of the double sided rack allows one or more users to collect the one or more objects and the rear portion of the double sided rack allows the at least one inverted robotic arm to replenish the plurality of shelves of the pair of racks with the one or more objects stored within the at least one movable shelf.

In some embodiments, each shelf of the plurality of shelves of the pair of racks is assigned with a unique identity (ID) code. The unique ID code for each of the plurality of shelves is stored within a memory communicatively with the at least one processor.

In some embodiments, the plurality of sensors corresponds to a computer vision (CV) sensor having a control unit. The CV sensor is configured to capture visual information of each of the plurality of shelves of the storage unit that is processed by the control unit to determine the status of each shelf of the plurality of shelves. Further, the status of each shelf of the plurality of shelves corresponds to a shelf without the one or more objects or the shelf with the one or more objects. Further, the at least one processor, upon determining the shelf without the one or more objects, is configured to control the at least one inverted robotic arm to place the one or more objects from the at least one movable shelf to the storage unit.

In some embodiments, each of the plurality of trays is integrated with a sensor configured to detect a status of a respective tray of the plurality of trays, wherein each sensor corresponds to a radio frequency identification (RFID) sensor. Further, the status of the one or more objects within the plurality of trays corresponds to a tray with the one or more objects or the tray without the one or more objects.

In some embodiments, the at least one robotic unit is configured to move along the pair of tracks from a first position proximate to a first end of the at least one end of the storage unit to a second end of the at least one end of the storage unit. Further, the at least one inverted robotic arm comprises at least one suction unit, wherein the at least one suction unit is configured to grip the one or more objects or a plurality of trays that contain the one or more objects.

In another example embodiment, a method is disclosed. The method comprises determining, via each sensor of a plurality of sensors, installed in proximity to or within each of a plurality of shelves, a status of a respective shelf of the plurality of shelves of each rack of a pair of racks of a storage unit having an opening on at least one end of the storage unit. The storage unit comprises each of the plurality of shelves configured to store one or more objects and a pair of tracks coupled, directly or indirectly, to the pair of racks. Thereafter, the method comprises controlling, via at least one processor communicatively coupled to the plurality of sensors, at least one inverted robotic arm of at least one robotic unit, to place the one or more objects from at least one movable shelf to a corresponding shelf of the plurality of shelves, based at least on the status of each shelf of the plurality of shelves. The at least one movable shelf is configured to be positioned within the opening of the storage unit, and wherein the at least one robotic unit is movably coupled to the pair of tracks.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below.

BRIEF DESCRIPTION OF THE DRAWINGS

Figure 1A:
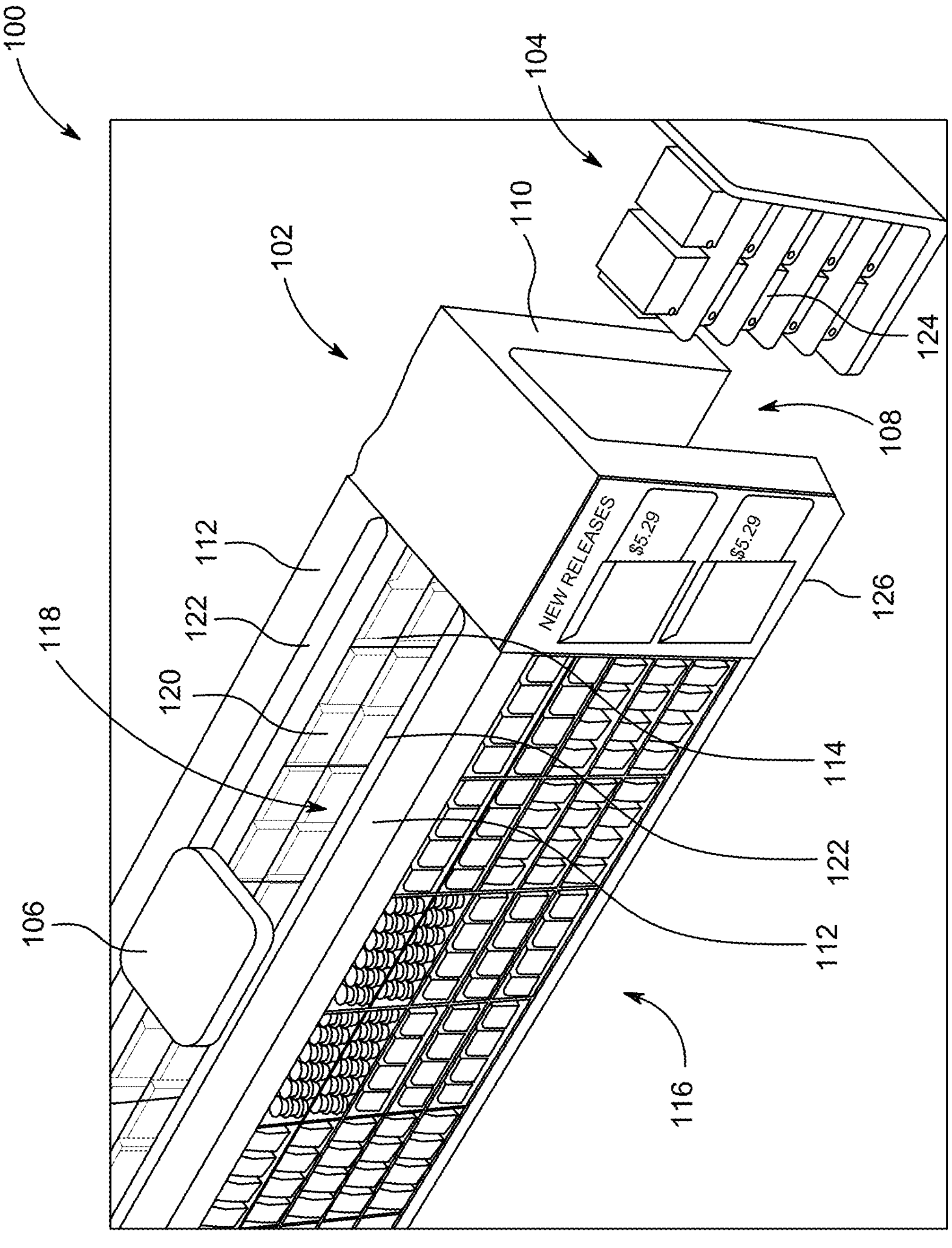
Figure 1B:
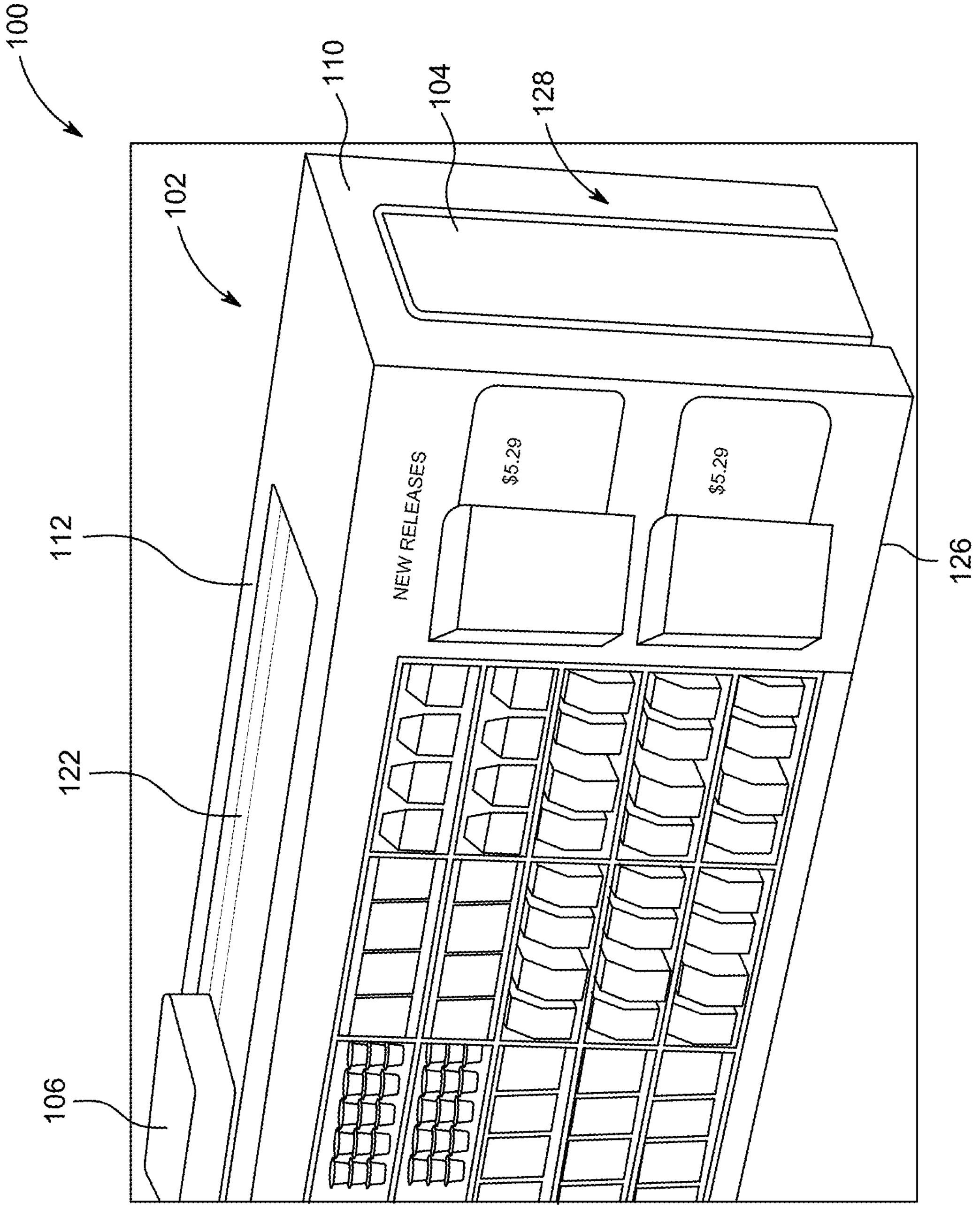
Figure 1C:
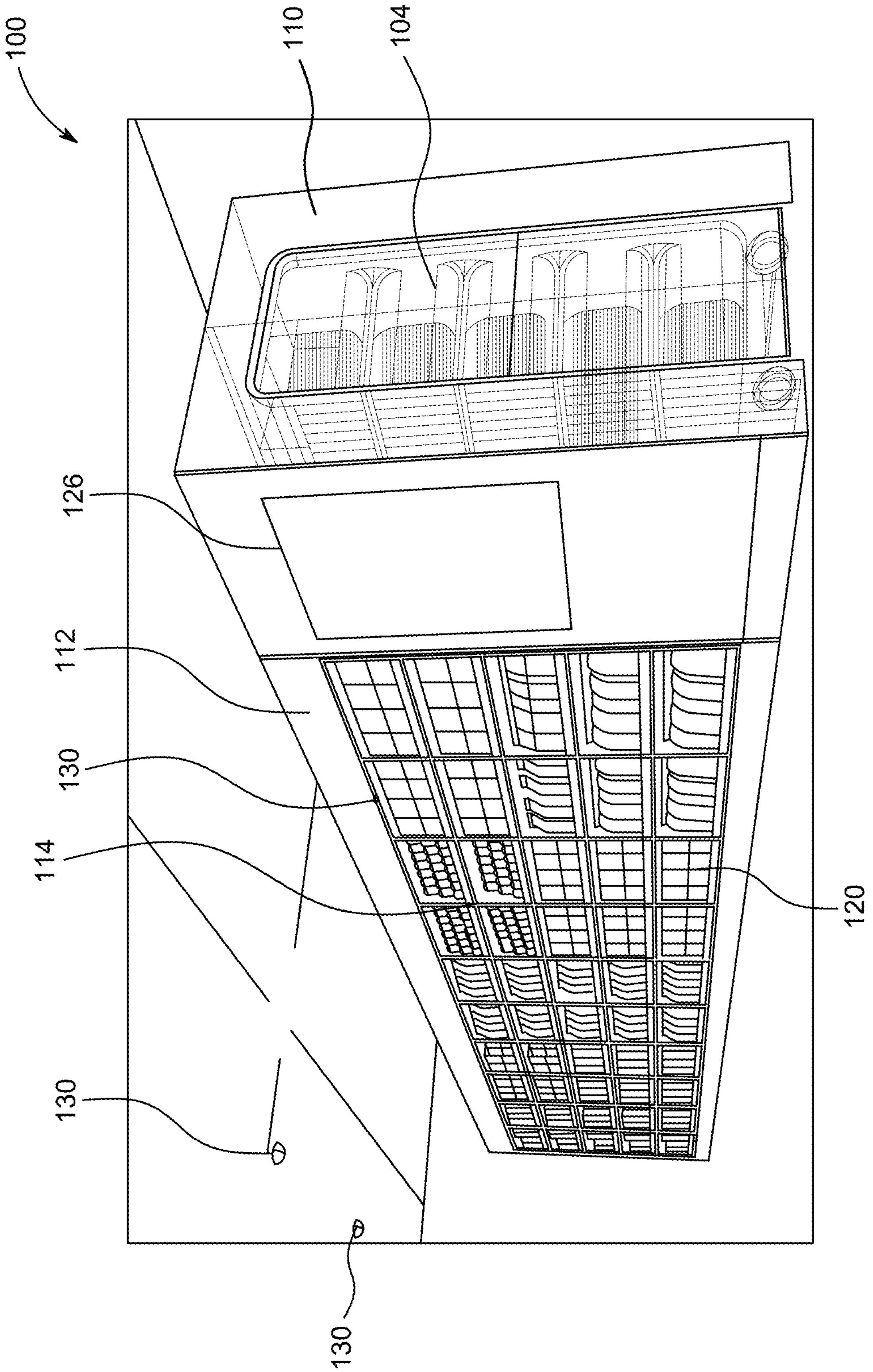
Figure 2:
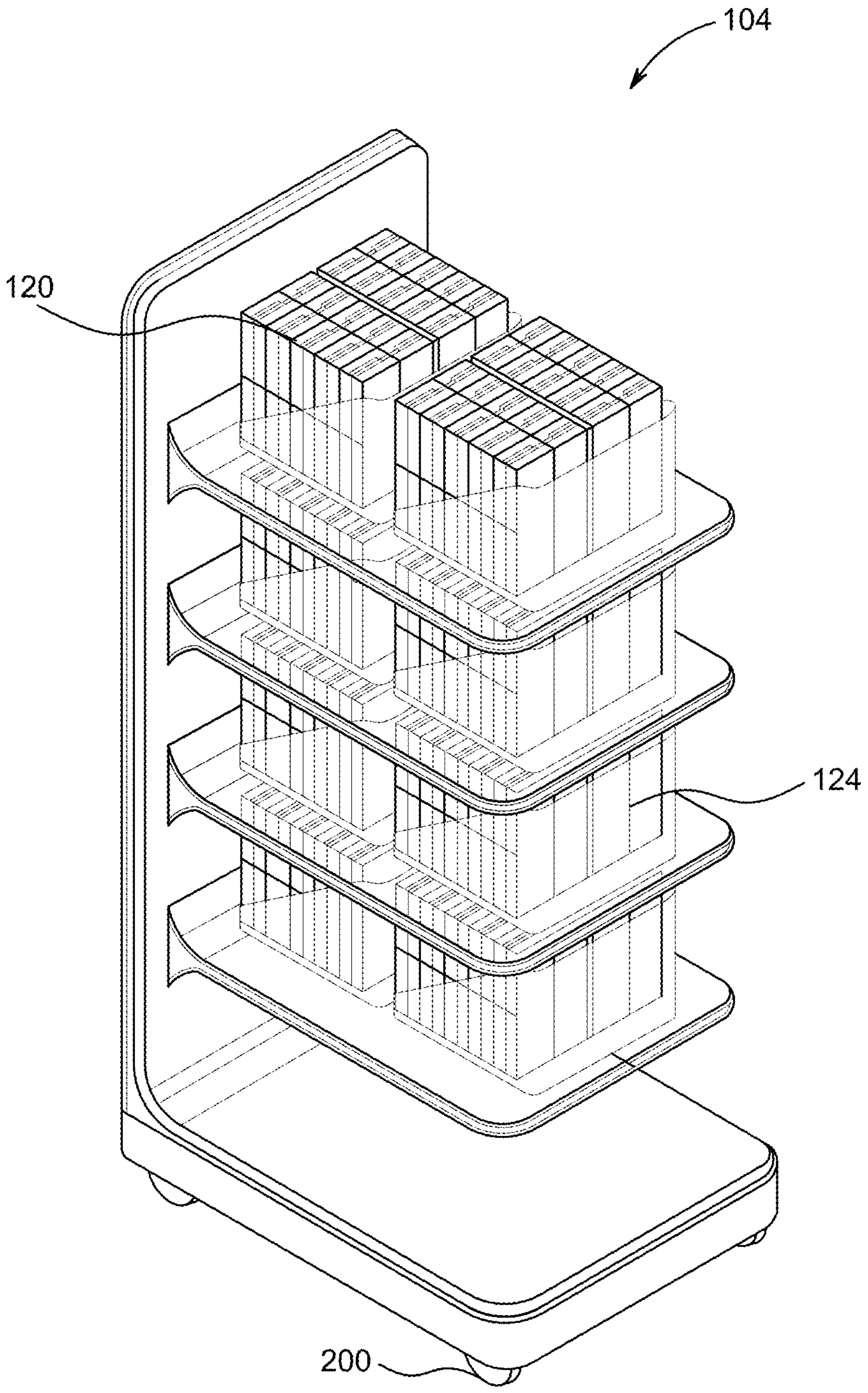
Figure 3A:
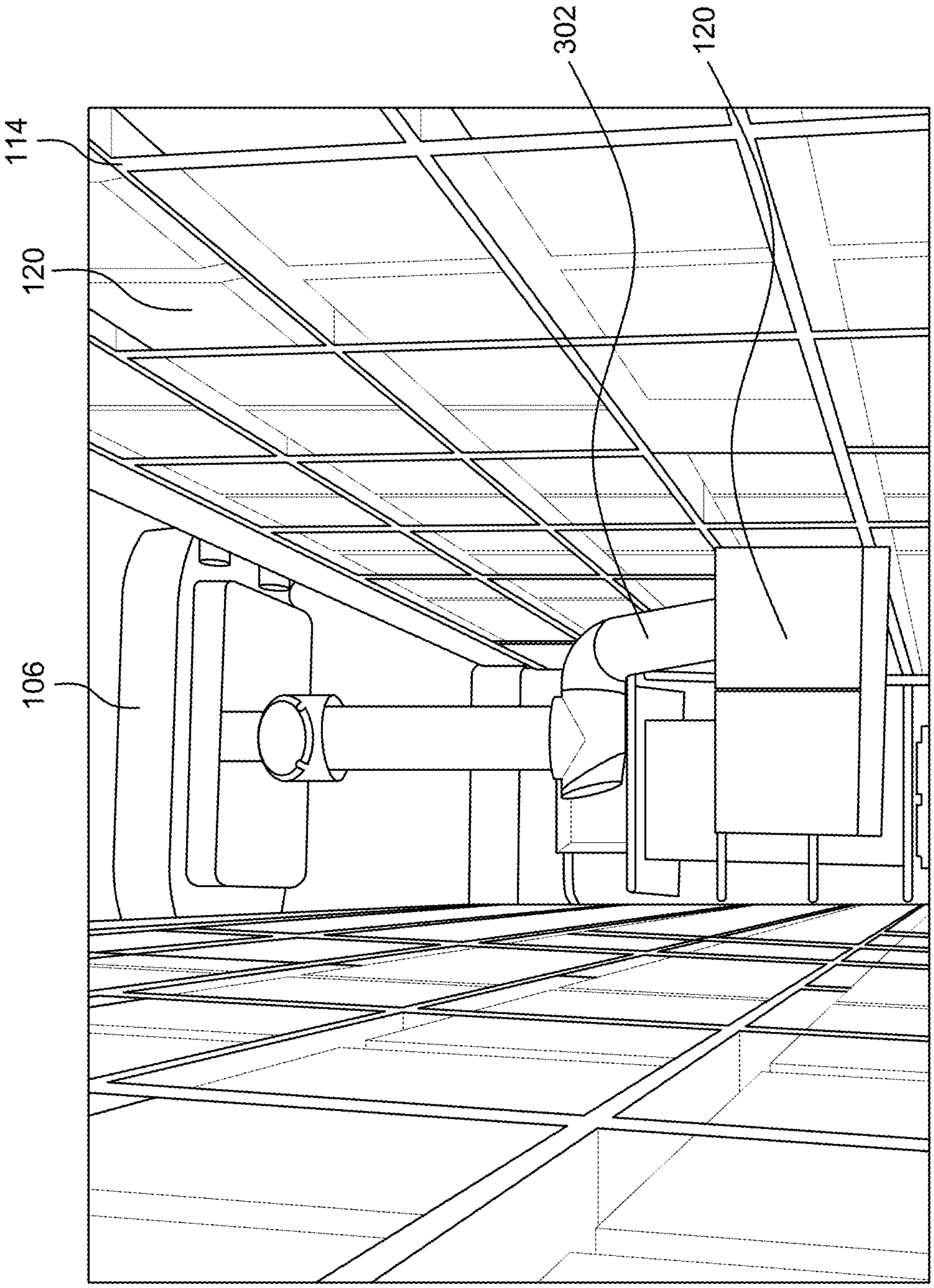
Figure 3B:
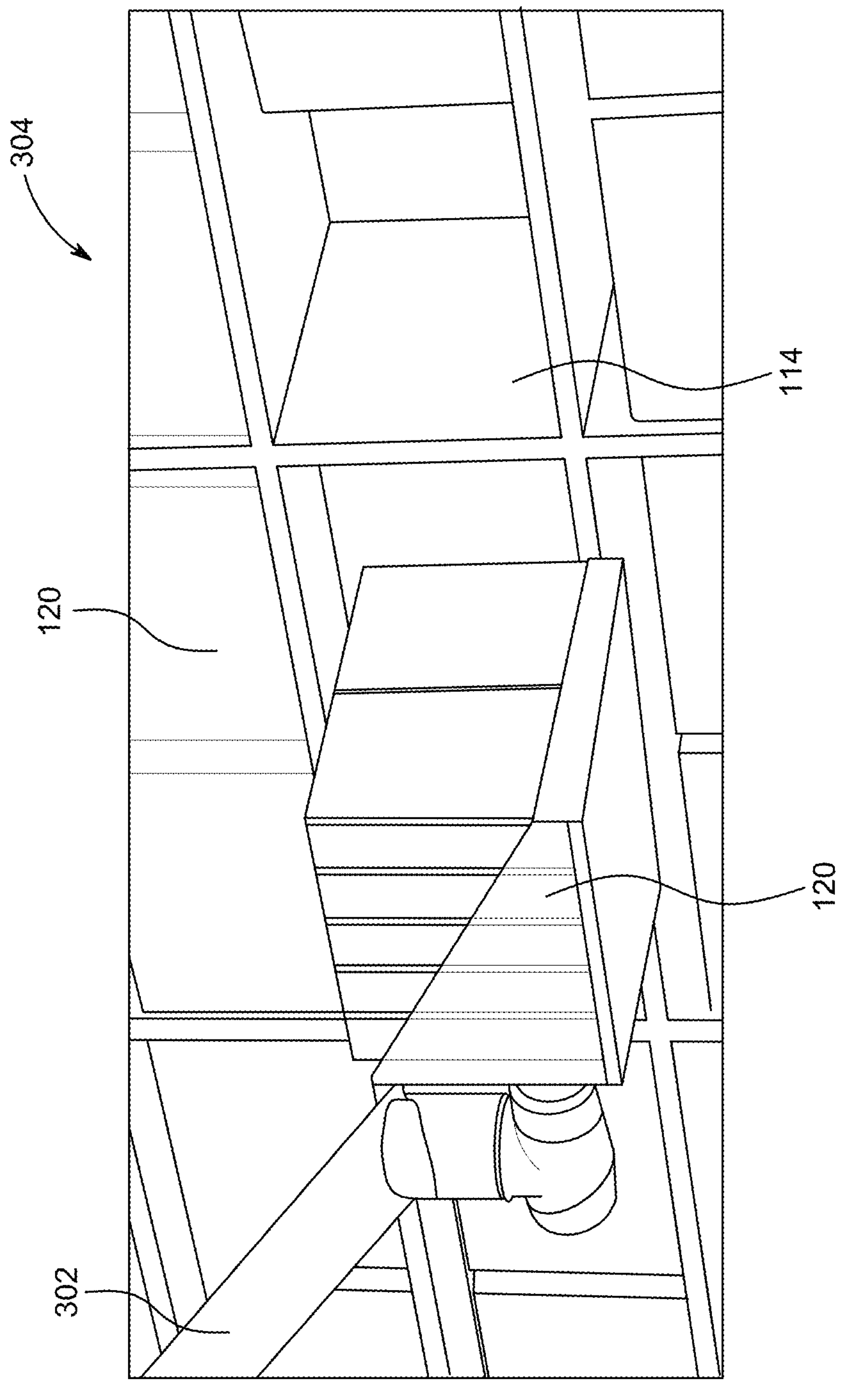
Figure 3C:
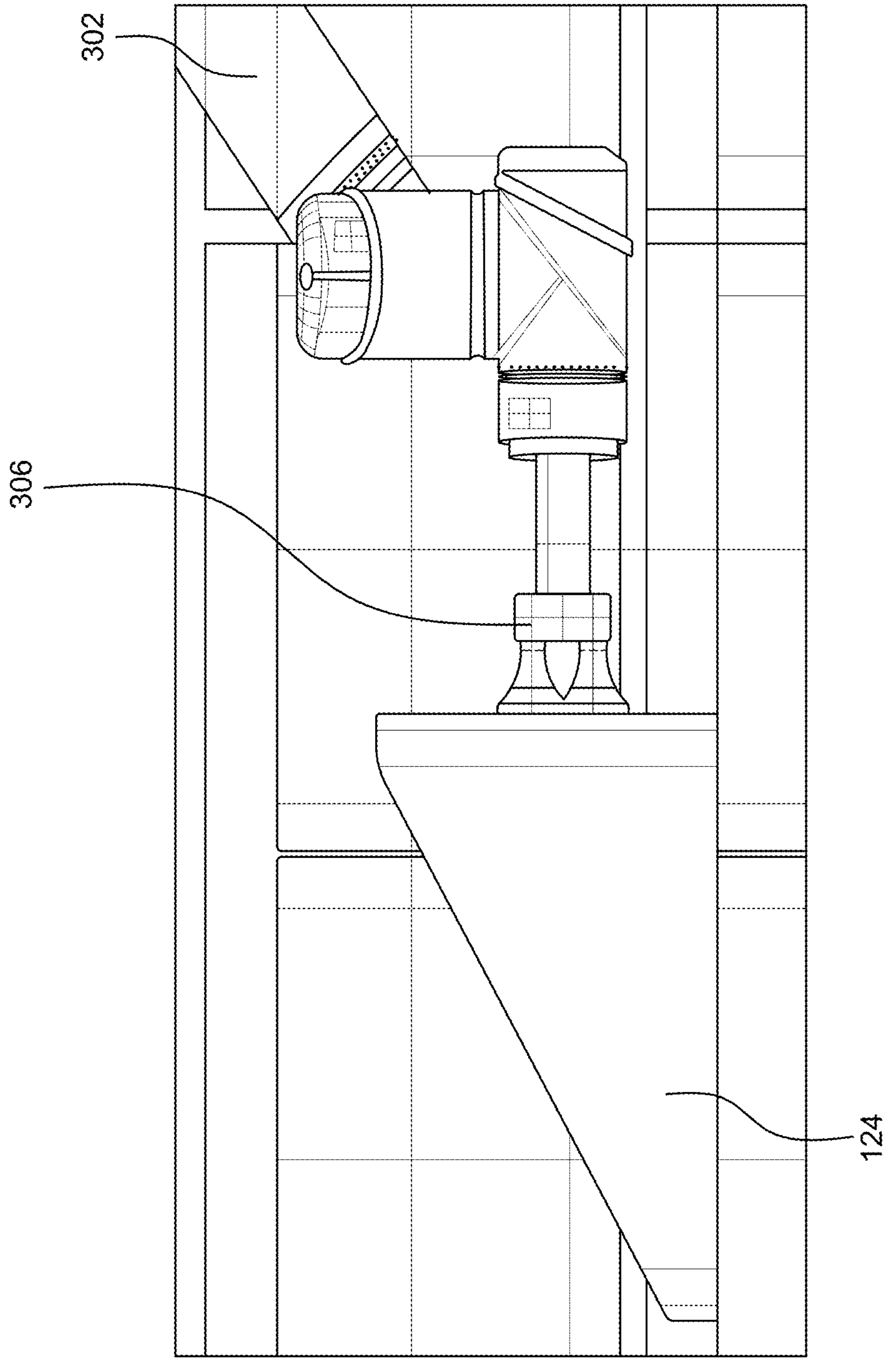
Figure 4:
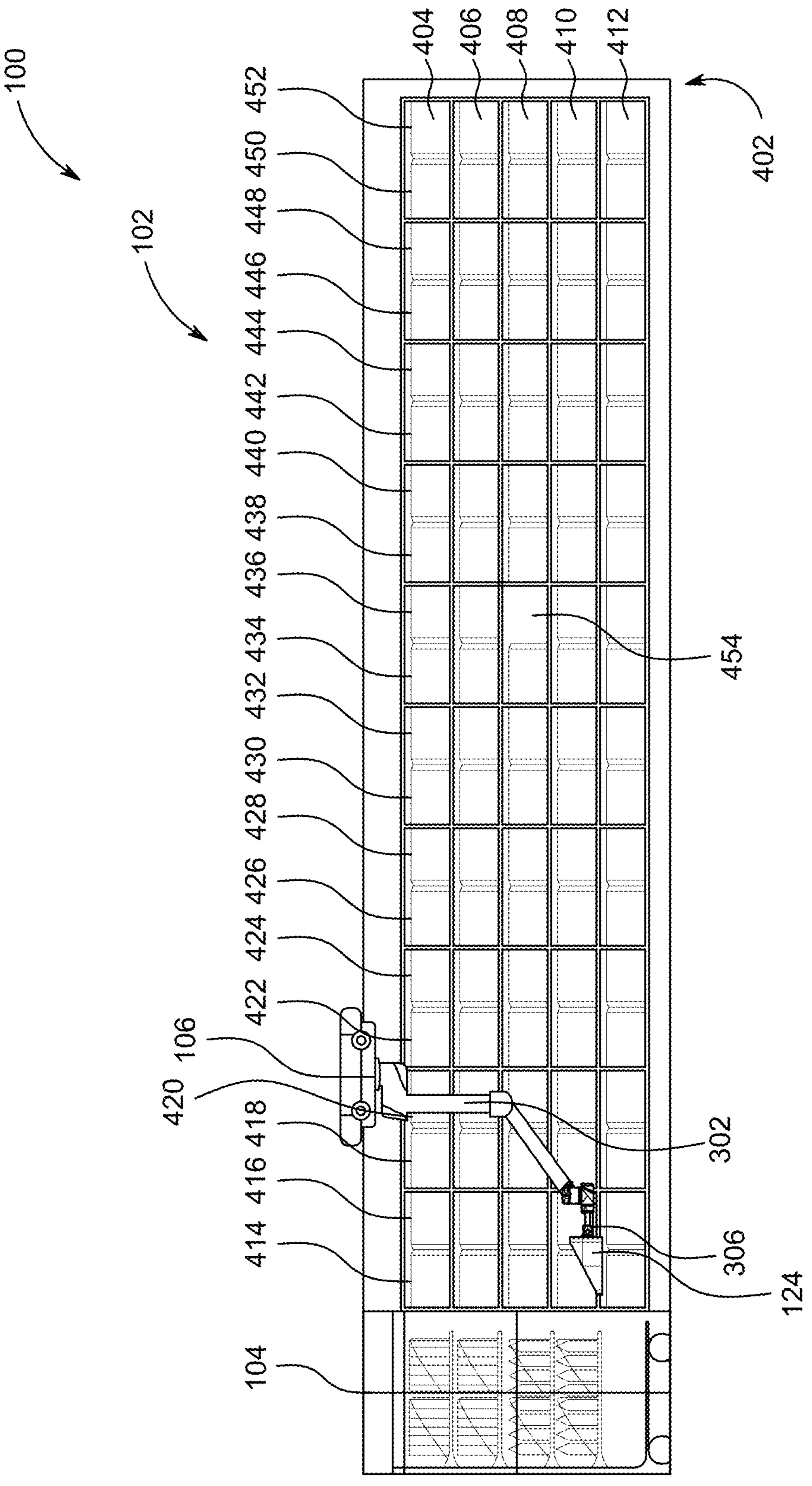
Figure 5:
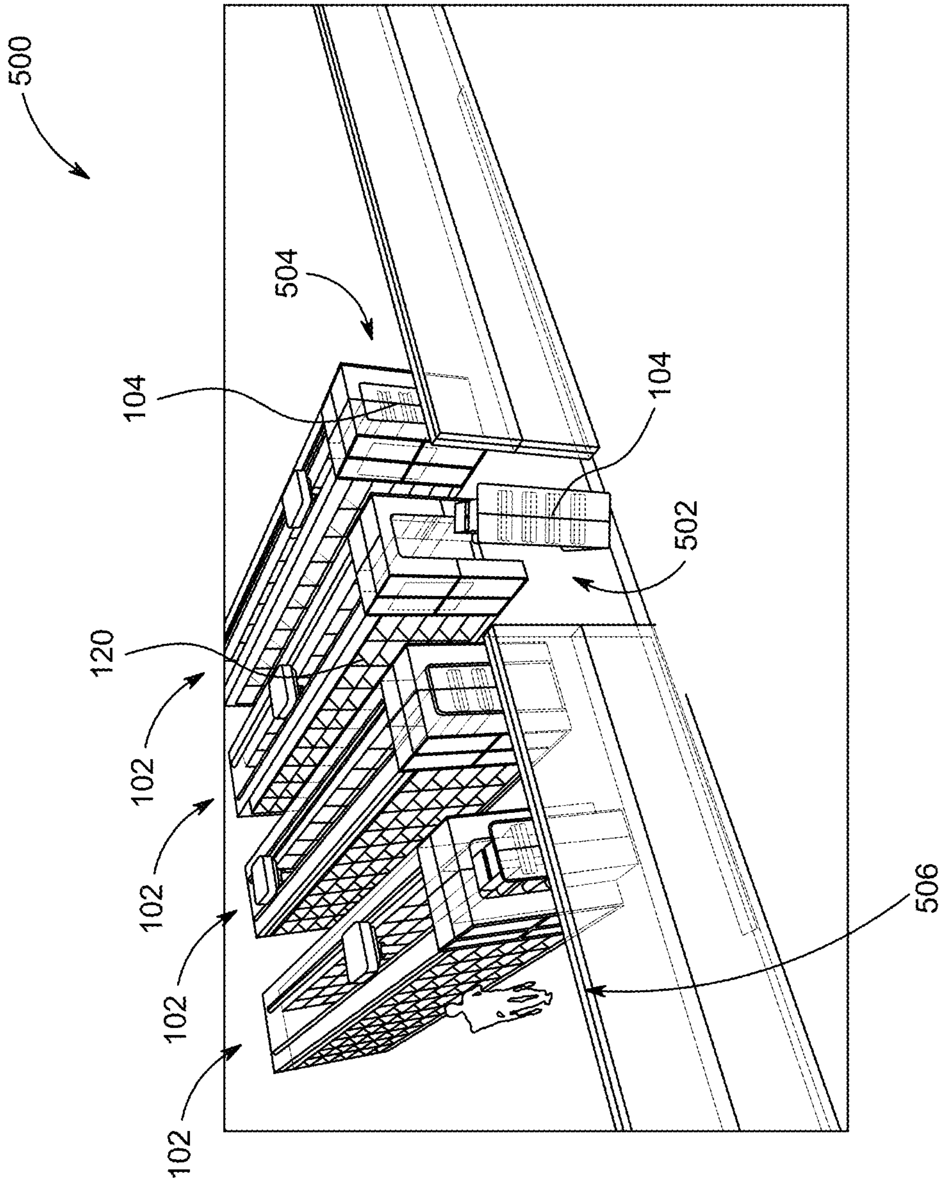
Figure 6:
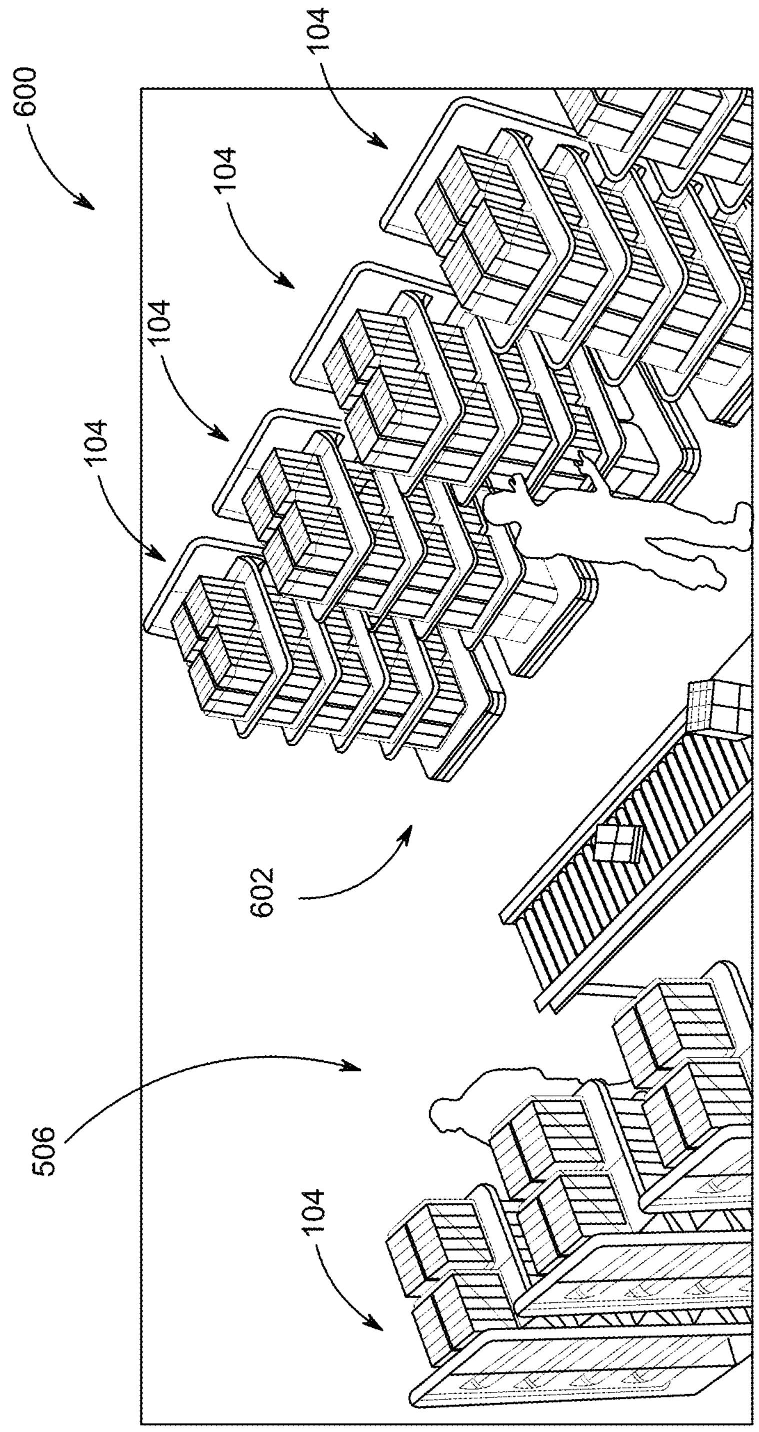
Figure 7:
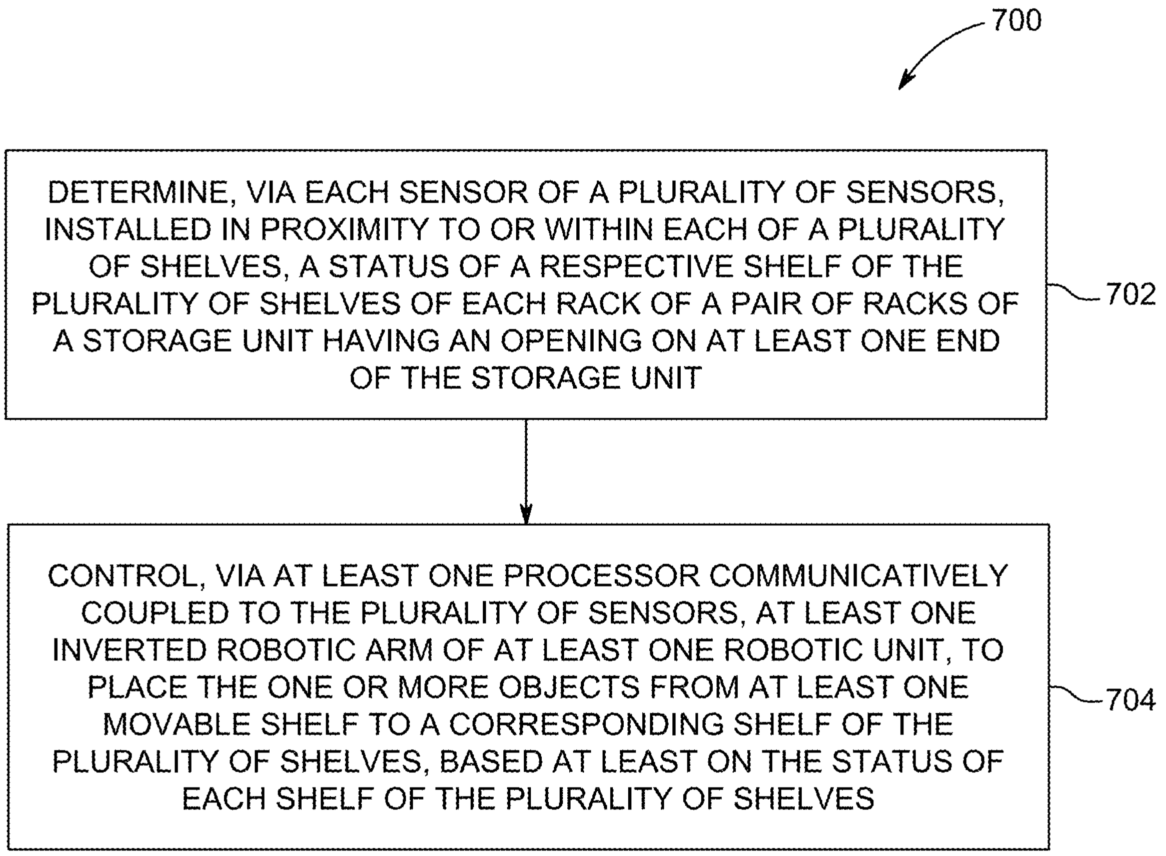

Having thus described certain example embodiments of the present disclosure in general terms, reference will hereinafter be made to the accompanying drawings, which are not necessarily drawn to scale, and wherein:

FIG. 1A illustrates an automated storage system in accordance with an example embodiment of the present disclosure;

FIG. 1B illustrates at least one movable shelf positioned within an opening of a storage unit of the automated storage system in accordance with an example embodiment of the present disclosure;

FIG. 1C illustrates a plurality of sensors installed in proximity to or within each of a plurality of shelves of the storage unit in accordance with an example embodiment of the present disclosure;

FIG. 2 illustrates an isometric view of the at least one movable shelf in accordance with an example embodiment of the present disclosure;

FIG. 3A illustrates at least one robotic unit movably coupled to a pair of tracks of the storage unit in accordance with an example embodiment of the present disclosure;

FIG. 3B illustrates the at least one inverted robotic arm replenishing one or more objects within a shelf of the plurality of shelves in accordance with an example embodiment of the present disclosure;

FIG. 3C illustrates at least one suction unit of the at least one robotic unit in accordance with an example embodiment of the present disclosure;

FIG. 4 illustrates the storage unit having the plurality of shelves as a numbered grid in accordance with an example embodiment of the present disclosure;

FIG. 5 illustrates an exemplary scenario showing a plurality of storage units within the automated storage system in accordance with an example embodiment of the present disclosure;

FIG. 6 illustrates an exemplary scenario showing storage of the at least one movable shelf in accordance with an example embodiment of the present disclosure; and FIG. 7 illustrates a flowchart showing a method for the automated storage system in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the disclosure described herein such that embodiments may include fewer or more components than those shown in the figures while not departing from the scope of the disclosure. Some components may be omitted from one or more figures or shown in dashed line for visibility of the underlying components.

The present disclosure provides various embodiments of an automated storage system. Embodiments may comprise a storage unit having an opening on at least one end of the storage unit. The storage unit may comprise a pair of racks, each rack having a plurality of shelves, each of the plurality of shelves are configured to store one or more objects, and a pair of tracks coupled, directly or indirectly, to the pair of racks. Embodiments may comprise a plurality of sensors, each sensor installed in proximity to or within each of the plurality of shelves. Each sensor is configured to determine a status of a respective shelf of the plurality of shelves. Embodiments may comprise at least one movable shelf configured to be positioned within the opening of the storage unit and having a plurality of trays configured to store the one or more objects. Embodiments may comprise at least one robotic unit movably coupled to the pair of tracks and comprising at least one inverted robotic arm. Embodiments may comprise at least one processor communicatively coupled to the plurality of sensors. Embodiments may be configured to control the at least one inverted robotic arm to place the one or more objects from the at least one movable shelf to a corresponding shelf of the plurality of shelves, based at least on the status of each shelf of the plurality of shelves.

FIG. 1A illustrates an automated storage system 100, in accordance with an example embodiment of the present disclosure. FIG. 1B illustrates positioning of at least one movable shelf 104 within an opening 108 of a storage unit 102 of the automated storage system 100, in accordance with an example embodiment of the present disclosure. FIG. 1C illustrates a plurality of sensors 130 installed in proximity to or within each of a plurality of shelves 114 of the storage unit 102 of the automated storage system 100, in accordance with an example embodiment of the present disclosure.

The automated storage system 100 may comprise the storage unit 102, at least one movable shelf 104, and at least one robotic unit 106. In some embodiments, the storage unit 102 may have the opening 108 on at least one end 110 of the storage unit 102. In an alternate embodiment, the automated storage system 100 may comprise a plurality of storage units 102. The storage unit 102 may comprise a pair of racks 112. Further, each rack of the pair of racks 112 may have a plurality of shelves 114. In an exemplary embodiment, each rack of the pair of racks 112 may correspond to a double sided rack. The double sided rack may be configured to store one or more objects 120 at a front portion, as illustrated by 116 and a rear portion, as illustrated by 118, of the double sided rack. In some embodiments, each of the plurality of shelves 114 may be configured to store the one or more objects 120. Further, the storage unit 102 may comprise a pair of tracks 122. In one example embodiment, the pair of tracks 122 may be coupled directly to the pair of racks 112. In another example embodiment, the pair of tracks 122 may be coupled indirectly to the pair of racks 112.

In some embodiments, the automated storage system 100 may comprise the at least one movable shelf 104. The at least one movable shelf 104 may comprise a plurality of trays 124. For example, the plurality of trays 124 may be positioned on shelving of the at least one movable shelf 104. The plurality of trays 124 may be configured to store or contain the one or more objects 120. The plurality of trays 124 may be configured to hold the one or more objects 120. Further, the at least one movable shelf 104 carrying the additional stock may be configured to bring or facilitate the bringing of the stock from another location, such as a back-of-house of a facility. The at least one movable shelf 104 may be configured to be positioned within the opening 108 of the storage unit 102, as illustrated by 128 in FIG. 1B. As a result, the at least one movable shelf 104 may be configured to substantially close off the opening 108 of the storage unit 102.

In some embodiments, the storage unit 102 may comprise an interface 126. The interface 126 may be configured to display information related to the stored one or more objects 120. The information may be presented by the interface 126 in a structured format for easy interpretation of one or more users. In one example embodiment, the information may comprise descriptive information such as details about the nature, attributes, or properties of the stored one or more objects 120. Further, the information may comprise organizational information that indicates how the stored one or more objects 120 are categorized, arranged, or indexed within the storage unit 102, facilitating efficient retrieval and management. Furthermore, the information may comprise metadata having additional data about the stored one or more objects 120 such as timestamps, authorship, or versioning information, enriching informational context and enhancing usability of the one or more objects 120.

In some embodiments, the automated storage system 100 may comprise a plurality of sensors 130, as illustrated in FIG. 1C. Each sensor 130 of the plurality of sensors 130 may be installed in proximity to each of the plurality of shelves 114. Additionally, each of the plurality of sensors 130 may be installed within each of the plurality of shelves 114. Each of the plurality of sensors 130 may be configured to determine a status of a respective shelf of the plurality of shelves 114. In an exemplary embodiment, each of the plurality of sensors 130 may correspond to a computer vision (CV) sensor. The CV sensor may have a control unit. Further, the plurality of CV sensors may be configured to capture visual information of each of the plurality of shelves 114 of the storage unit 102. The one or more objects 120 may be detected by the CV sensors under each shelf of the plurality of shelves 114. The CV sensors may have full view of the plurality of trays 124. In one example embodiment, at least one CV sensor may be placed above each tray under the plurality of shelves 114.

Further, at least some of the CV sensors may be mounted on a ceiling of the facility to get a broader view of the plurality of shelves 114. In some embodiments, the CV sensors mounted on the ceiling may correspond to redundancy sensor. The visual information captured by each CV sensor may comprise the presence of the one or more objects and the location of the one or more objects on each of the plurality of shelves 114. The visual information may be processed by the control unit. The visual information may be processed to determine the status of each shelf of the plurality of shelves 114. In an example embodiment, the status of each shelf of the plurality of shelves 114 may correspond to whether one or more object 120 are within a shelf, whether a quantity of the one or more objects 120 is above or below a threshold value, and/or whether the shelf is empty and does not include any objects 120. For example, a status of a shelf 114 may be indicative of a shelf 114 without the one or more objects 120. In another example embodiment, a status of a shelf of the plurality of shelves 114 may be indicative of the shelf with the one or more objects 120.

In some embodiments, the automated storage system 100 may comprise the at least one robotic unit 106. The at least one robotic unit 106 may be movably coupled to the pair of tracks 122. For example, the at least one robotic unit 106 may be configured to slide along the pair of tracks 122. The plurality of tracks 122 may be constructed from durable and resilient materials such as reinforced steel or aluminum alloy to provide a sturdy and stable foundation for the at least one robotic unit 106. The construction of the plurality of tracks 122 may ensure longevity and reliability, essential for continuous operation of the automated storage system 100 in demanding industrial environments. The at least one robotic unit 106 may have at least one inverted robotic arm 302. The at least one robotic unit 106 may be configured to move over the pair of tracks 122. The at least one robotic unit 106 may move over the pair of tracks 122 from the at least one end 110 of the storage unit 102 to another end (not shown) of the storage unit 102.

Further, at least one processor (not shown) may be communicatively coupled to the plurality of sensors 130. The at least one processor may be configured to control the at least one inverted robotic arm 302 to place the one or more objects 120 from the at least one movable shelf 104 to a corresponding shelf of the plurality of shelves 114. In one example embodiment, the at least one processor may send a control signal to actuate a motor (not shown) or an electric actuator (not shown) of the at least one robotic unit 106 and the at least one inverted robotic arm 302. The actuated motor or the electric actuator may control the movement of the at least one robotic unit 106 and the at least one inverted robotic arm 302 to place the one or more objects. The at least one inverted robotic arm 302 may place the one or more objects 120 based at least on the status of each shelf of the plurality of shelves 114. In one case, when the at least one movable shelf 104 may run out of stock of the one or more objects 120, the at least one movable shelf 104 may be prompted to go to the back-of-house for replenishment or a notification may be sent to an operator that the at least one movable shelf is out of stock and needs to be replenished.

The at least one processor may include suitable logic, circuitry, and/or interfaces that are operable to execute one or more instructions stored in a memory (not shown) to perform predetermined operations. In one embodiment, the at least one processor may be configured to decode and execute any instructions received from one or more other electronic devices or server(s). The at least one processor may be configured to execute one or more computer-readable program instructions, such as program instructions to carry out any of the functions described in this description. Examples of the at least one processor include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

In some embodiments, the memory may be configured to store a set of instructions and data executed by the at least one processor. Further, the memory may include the one or more instructions that are executable by the at least one processor to perform specific operations. The memory may be configured to include the instructions to control the at least one inverted robotic arm to place the one or more objects 120 from the at least one movable shelf 104 to the corresponding shelf of the plurality of shelves 114. Further, the memory may be configured to store a unique identity (ID) code assigned to each shelf of the plurality of shelves 114. It is apparent to a person with ordinary skill in the art that the one or more instructions stored in the memory enable the hardware of the automated storage system 100 to perform the predetermined operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In some embodiments, the automated storage system 100 may further comprise an input/output circuitry (not shown). The input/output circuitry may enable a user to communicate or interface with the automated storage system 100, via a user device (not shown). The user device may include N number of user devices. In some embodiments, the input/output circuitry may act as a medium to transmit input from the interface 126 to and from the automated storage system 100. In some embodiments, the input/output circuitry may refer to the hardware and software components that facilitate the exchange of information between the user device and the automated storage system 100. In one example, the user device may include a graphical user interface (GUI) (not shown) as input circuitry to allow the one or more users to provide input to the automated storage system 100. The input/output circuitry may include various input devices such as keyboards, barcode scanners, GUI for the one or more users to provide data and various output devices such as displays, printers for the one or more users to receive data. In another example, the input/output circuitry may include various output circuitry such as a display to show the placed one or more objects 120.

In some embodiments, the automated storage system 100 may further comprise a communication circuitry (not shown). The communication circuitry may allow the automated storage system 100 to exchange data or information with other systems or apparatuses. Further, the communication circuitry may include network interfaces, protocols, and software modules responsible for sending and receiving data or information. In some embodiments, the communication circuitry may include Ethernet ports, Wi-Fi adapters, or communication protocols like HTTP or MQTT for connecting with other systems. The communication circuitry may further include components such as communication modules (e.g., Wi-Fi, Bluetooth, radio-frequency identification (RFID), Ethernet, cellular), transceivers, antennas, high-data cables, and protocols (e.g., TCP/IP, MQTT, SNMP) for exchanging data with other systems or network devices. The communication circuitry may allow the automated storage system 100 to stay up-to-date and accurately track the placement of the one or more objects 120.

It will be apparent to one skilled in the art that above-mentioned components of the automated storage system 100 have been provided only for illustration purposes, without departing from the scope of the disclosure.

FIG. 2 illustrates an isometric view of the at least one movable shelf 104, in accordance with an example embodiment of the present disclosure.

As described, the automated storage system 100 may comprise the at least one movable shelf 104. The at least one movable shelf 104 may be configured to be positioned within the opening 108 of the storage unit 102. The at least one movable shelf 104 positioned within the opening 108 may optimize space utilization. Further, the at least one movable shelf 104 positioned within the opening 108 may ensure efficient storage management. The at least one movable shelf 104 may have the plurality of trays 124 configured to store the one or more objects 120.

In some embodiments, each of the plurality of trays 124 may be integrated with a sensor (not shown). The sensor may be configured to detect a status of a respective tray of the plurality of trays 124 within the automated storage system 100. Each sensor of the plurality of trays 124 may correspond to a radio frequency identification (RFID) sensor. The RFID sensor may aid in tracking a level of the stock of the one or more objects 120 in the plurality of trays 124 in real-time. Further, the tracking in real-time may maintain accurate and up-to-date record of the stock of the one or more objects 120 to facilitate replenishment of the one or more objects 120 within the pair of rack 112. Furthermore, the RFID sensor may contribute to enabling timely identification of the status of the one or more objects 120 to minimize the likelihood of stockouts or overstocking. In one example embodiment, the status of the one or more objects 120 within the plurality of trays 124 may correspond to a tray with the one or more objects 120. In another example embodiment, the status of the one or more objects 120 within the plurality of trays 124 may correspond to the tray without the one or more objects 120.

In some embodiments, the at least one movable shelf 104 may be installed with a plurality of motorized wheels 200. In some embodiments, the plurality of motorized wheels 200 may be configured to enable the at least one movable shelf 104 to move within the facility in one or more directions and also place inside the opening 108 of the storage unit 102. In some embodiments, the plurality of motorized wheels 200 may be remotely operated by a user 506. In some embodiments, the at least one movable shelf 104 may be manually operated by a user 506.

FIG. 3A illustrates at least one robotic unit 106 movably coupled to the pair of tracks 122, in accordance with an example embodiment of the present disclosure. FIG. 3B illustrates the at least one inverted robotic arm 302 replenishing the one or more objects 120 within a shelf of the plurality of shelves 114, in accordance with an example embodiment of the present disclosure. FIG. 3C illustrates at least one suction unit 306 of the at least one inverted robotic arm 302, in accordance with an example embodiment of the present disclosure.

As described, the automated storage system 100 may comprise the at least one robotic unit 106 movably coupled to the pair of tracks 122. The at least one robotic unit 106 may be configured to move along the pair of tracks 122 from a first position proximate to a first end of the at least one end of the storage unit 102 to a second position proximate to a second end of the at least one end of the storage unit 102. The first end may correspond to the at least one end 110. The at least one robotic unit 106 may be configured to move along the pair of tracks 122 to reach all parts of the storage unit 102. In some embodiments, the at least one robotic unit 106 may comprise at least one inverted robotic arm 302. Further, the rear portion of the double sided rack may allow the at least one inverted robotic arm 302 to replenish the plurality of shelves 114 of the pair of racks 112 with the one or more objects 120 stored within the at least one movable shelf 104, as illustrated by 304 in FIG. 3B.

In some embodiments, each shelf of the plurality of shelves 114 of the pair of racks 112 may be assigned with a unique identity (ID) code. The unique ID code for each of the plurality of shelves 114 may be stored within the memory communicatively coupled with the at least one processor. In some embodiments, the at least one processor, upon determining the shelf without the one or more objects 120, may be configured to control the at least one inverted robotic arm 302. Further, the at least one inverted robotic arm 302 may comprise at least one suction unit 306, as illustrated in FIG. 3C.

The at least one suction unit 306 may be configured to grip the one or more objects 120 or a plurality of trays 124 that contain the one or more objects 120 that are positioned on the at least one movable shelf 104. The at least one inverted robotic arm 302 may remove an empty tray from the plurality of trays 124. Further, the at least one inverted robotic arm 302 may retrieve a new tray comprising the one or more objects 120 from the plurality of trays 124 of the at least one movable shelf 104. The at least one inverted robotic arm 302 may be controlled to place the one or more objects 120 from the at least one movable shelf 104 to the storage unit 102 to replenish the plurality of shelves 114. In one example embodiments, the at least movable shelf may hold most frequently bought one or more objects 120 for more frequent replenishment. Further, the replenishment of the one or more objects 120 may be determined by sales data that tracks seasonal trends and consumer habits with respect to the one or more objects 120.

FIG. 4 illustrates the storage unit 102 having the plurality of shelves 114 as a numbered grid, in accordance with an example embodiment of the present disclosure.

As described, the at least one processor may control the at least one inverted robotic arm 302 to place the one or more objects 120 from the at least one movable shelf 104. Further, the at least one processor may control the at least one inverted robotic arm 302 towards an intended location on a rack 402 of the storage unit 102, to place the one or more objects 120. Further, the rack 402 of the storage unit 102 may comprise a plurality of rows. In an exemplary embodiment, the plurality of rows may comprise a first row 404, a second row 406, a third row 408, a fourth row 410, and a fifth row 412. The at least one inverted robotic arm 302 may be configured to move along the plurality of rows on the rack 402 to reach the plurality of shelves 114. In one example embodiment, the at least one inverted robotic arm 302 may be configured to move along the first row 404 of the rack 402 to reach the plurality of shelves 114 situated on the first row 404. In another example embodiment, the at least one inverted robotic arm 302 may be configured to move along the second row 406 of the rack 402 to reach the plurality of shelves 114 situated on the second row 406. In yet another example embodiment, the at least one inverted robotic arm 302 may be configured to move along the third row 408 of the rack 402 to reach the plurality of shelves 114 situated on the third row 408. In another example embodiment, the at least one inverted robotic arm 302 may be configured to move along the fourth row 410 of the rack 402 to reach the plurality of shelves 114 situated on the fourth row 410. In yet another example embodiment, the at least one inverted robotic arm 302 may be configured to move along the fifth row 412 of the rack 402 to reach the plurality of shelves 114 situated on the fifth row 412.

In some embodiments, a number may be allocated to each of the plurality of shelves 114 of the rack 402, in order to place the one or more objects 120. In one example, the first row 404 may comprise a first grid 414 denoted as "1", a second grid 416 denoted as "2", a third grid 418 denoted as "3", a fourth grid 420 denoted as "4", a fifth grid 422 denoted as "5", a sixth grid 424 denoted as "6", a seventh grid 426 denoted as "7", an eighth grid 428 denoted as "8", a ninth grid 430 denoted as "9", a tenth grid 432 denoted as "10", an eleventh grid 434 denoted as "11", a twelfth grid 436 denoted as "12", a thirteenth grid 438 denoted as "13", a fourteenth grid 440 denoted as "14", a fifteenth grid 442 denoted as "15", a sixteenth grid 444 denoted as "16", a seventeenth grid 446 denoted as "17", an eighteenth grid 448 denoted as "18", a nineteenth grid 450 denoted as "19", a twentieth grid 452 denoted as "20".

In some embodiments, the at least one processor may be configured to control the at least one inverted robotic arm 302 based on the status of each shelf. The at least one processor may be configured to control the at least one inverted robotic arm 302 by determining the plurality of integrated tracks and the number grid to place the one or more objects 120 at correct location on rack 402 of the storage unit 102. In one example, the plurality of sensors 130 may determine the status of a shelf 454 located on the third row 408 and the number grid 12 as a tray without the one or more objects 120. Further, the at least one processor may control the at least one inverted robotic arm 302 to place the one or more objects 120 from the at least one movable shelf 104 to the shelf 454 on the third row 408 and the number grid 12, to replenish the stock of the one or more objects 120. Therefore, the automated storage system 100 may keep track of location of stock of the one or more objects 120 on the storage unit 102.

FIG. 5 illustrates an exemplary scenario 500 showing a plurality of storage units within the automated storage system 100, in accordance with an example embodiment of the present disclosure.

In some embodiments, the at least one movable shelf 104 may undock from the storage unit 102, as illustrated by 502. In some embodiments, the undocking of the at least one movable shelf 104 may indicate inherent flexibility and adaptability of the automated storage system 100, allowing the at least one movable shelf 104 to undock/disengage from the opening 108 to facilitate replenishment. Further, the at least one movable shelf 104 undocked from storage unit 102 may navigate to a predetermined parking spot in the facility, for replenishment. Further, the at least one movable shelf 104 that is docked to the at least one movable shelf 104 may hold stock of the one or more objects 120 and charge, as illustrated by 504. The docked at least one movable shelf 104 may serve as pivotal hub in the operation of the automated storage system 100, concurrently holding stock of the one or more objects 120 while providing charging capabilities to ensure uninterrupted operational continuity. Through the synchronized interplay between undocking and docking of the at least one movable shelf 104, the automated storage system 100 may achieve optimal resource utilization and operational efficiency, thereby enhancing productivity and responsiveness within the operation of the automated storage system 100.

FIG. 6 illustrates an exemplary scenario 600 showing storage of the at least one movable shelf 104, in accordance with an example embodiment of the present disclosure.

In some embodiments, the undocked at least one movable shelf 104 may head to the predetermined parking spot in the facility, for replenishment, as illustrated by 602. The at least one movable shelf 104 may autonomously execute replenishment of the stock of the one or more objects 120, thereby streamlining the operation and enhancing the efficiency of the operation of the automated storage system 100. In one example embodiment, the at least one movable shelf 104 may be parked for stock replenishment by the at least one processor and robotic circuitry embedded in the at least one movable shelf 104, in the back-of-house of the facility. In another example embodiment, the at least one movable shelf 104 may be parked for stock replenishment by one or more users in the back-of-house of the facility.

In some embodiments, the at least one processor may be integrated with one or more algorithms that may handle, automate, optimize, and coordinate all stock replenishment of the one or more objects 120. In some embodiments, the at least one movable shelf 104 may communicate to a centralized command center that runs the one or more algorithms to automate the stock replenishment. In some embodiments, the intervention by the one or more users may complement the autonomous capability of the automated storage system 100 to ensure seamless replenishment of the stock of the one or more objects 120. By offering multiple pathways for stock replenishment, the automated storage system 100 may accommodate cater to the unique requirements and operational modalities of different facilities in which the automated storage system 100 may be installed.

FIG. 7 illustrates a flowchart showing a method 700 for the automated storage system 100, in accordance with an example embodiment of the present disclosure.

At operation 702, each sensor of the plurality of sensors 130, installed in proximity to or within each of the plurality of shelves 114, may be configured to determine a status of the respective shelf of the plurality of shelves 114 of each rack of the pair of racks 112 of the storage unit 102 having the opening 108 on the at least one end 110 of the storage unit 102. In some embodiments, the storage unit 102 may comprise the plurality of shelves 114 configured to store the one or more objects 120, and the pair of tracks 122 coupled, directly or indirectly, to the pair of racks 112. In some embodiments, each rack of the pair of racks 112 may correspond to the double sided rack that is configured to store the one or more objects 120 at the front portion and the rear portion of the double sided rack. The front portion of the double sided rack may allow one or more users to collect the one or more objects 120. The rear portion of the double sided rack may allow the at least one inverted robotic arm 302 to replenish the plurality of shelves 114 of the pair of racks 112 with the one or more objects 120 stored within the at least one movable shelf 104. Further, each of the plurality of trays 124 of the at least one movable shelf 104 may be integrated with the plurality of sensors 130 configured to detect the status of each of the plurality of trays 124. The plurality of sensors 130 may correspond to the RFID sensor.

In some embodiments, the status of the one or more objects 120 within the plurality of trays 124 may correspond to the tray with the one or more objects 120 or the tray without the one or more objects 120. In some embodiments, the plurality of sensors 130 may correspond to the CV sensor having the control unit. Further, the CV sensor may be configured to capture visual information of each of the plurality of shelves 114 of the storage unit 102 that is processed by the control unit to determine the status of each shelf of the plurality of shelves 114. The status of each shelf of the plurality of shelves 114 may correspond to the shelf without the one or more objects 120 or the shelf with the one or more objects 120.

In one example, the automated storage system 100 may utilize a CV sensor to determine the status of each shelf within the pair of racks 112 located at the storage unit 102. The storage unit 102 comprises the plurality of shelves 114 to store an object, and a pair of tracks 122 mounted over the pair of racks 112 for object storage and tracks mounted over the racks. Each rack, resembling a double-sided structure, allows for object storage at both the front portion and the rear portions. Users access the object from the front portion, while the at least one inverted robotic arm 302 replenishes the shelf from the rear portion. A tray within the at least one movable shelve integrates with RFID sensor to detect status of the tray. Alternatively, the CV sensor, equipped with the control unit, captures visual information to determine status of the shelf. The CV sensor facilitates efficient monitoring and management of object storage.

At operation 704, the at least one processor communicatively coupled to the plurality of sensors 130, may be configured to control at least one inverted robotic arm 302 of the at least one robotic unit 106, to place the one or more objects 120 from at least one movable shelf 104 to a corresponding shelf of the plurality of shelves 114, based at least on the status of each shelf of the plurality of shelves 114. In some embodiments, the at least one movable shelf 104 may be configured to be positioned within the opening 108 of the storage unit. Further, the at least one robotic unit 106 is movably coupled to the pair of tracks 122. In some embodiments, each shelf of the plurality of shelves 114 of the pair of racks 112 may be assigned with the unique ID code. The unique ID code for each of the plurality of shelves 114 may be stored within the memory communicatively with the at least one processor.

In one example, the at least one processor of the at least one robotic unit 106 activates the at least one inverted robotic arm 302 to transfer one or more objects 120 from the at least one movable shelf 104 to the corresponding shelf based on the status of the shelf. Each shelf of the rack may have the unique ID code stored in memory, to facilitate organized placement of the one or more objects 120.

In some embodiments, the method may further comprise controlling via the at least one processor, the at least one inverted robotic arm 302 to place the one or more objects 120 from the at least one movable shelf 104 to the storage unit 102, upon determining the shelf without the one or more objects 120. In some embodiments, the method may further comprise moving the at least one robotic unit 106 along the pair of tracks 122 from the one end of the storage unit 102 to another end of the storage unit 102. Further, the at least one inverted robotic arm 302 may comprise at least one suction unit 306. In some embodiments, the at least one suction unit 306 may be configured to grip the one or more objects 120 or the plurality of trays 124 that may contain the one or more objects 120.

The present disclosure may provide reduction in labor requirements for shelf auditing and restocking by automating the storage process of the one or more objects, freeing up human resources for more value-added tasks. The automated storage system may provide efficiency that contributes to increased profitability by minimizing labor costs associated with manual inventory management. Additionally, the automated storage system may enhance stock availability at the shelf-level, ensuring that the one or more objects are consistently in stock and accessible to customers, thereby improving customer satisfaction and loyalty. Moreover, the automated storage system may improve inventory accuracy by utilizing the plurality of sensors to precisely track the status of each shelf and automate restocking decisions, reducing instances of stockouts or overstocking. The automated storage system may operate 24 by 7 that further maximizes efficiency and responsiveness to customer demands, ultimately leading to improved operational performance and customer satisfaction.

Many modifications and other embodiments of the disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An automated storage system comprising:

a storage unit having an opening on at least one end of the storage unit, wherein the storage unit comprises:

a pair of racks, each rack having a plurality of shelves, wherein each of the plurality of shelves are configured to store one or more objects; and a pair of tracks coupled, directly or indirectly, to the pair of racks;

a plurality of sensors, each sensor installed in proximity to or within each of the plurality of shelves, wherein each sensor is configured to determine a status of a respective shelf of the plurality of shelves;

at least one movable shelf configured to be positioned within the opening of the storage unit and comprising a plurality of trays configured to store the one or more objects;

at least one robotic unit movably coupled to the pair of tracks and comprising at least one inverted robotic arm; and at least one processor communicatively coupled to the plurality of sensors, wherein the at least one processor is configured to:

control the at least one inverted robotic arm to place the one or more objects from the at least one movable shelf to a corresponding shelf of the plurality of shelves, based at least on the status of each shelf of the plurality of shelves.

2. The automated storage system of claim 1, wherein each shelf of the plurality of shelves of the pair of racks is assigned with a unique identity (ID) code, wherein the unique ID code for each of the plurality of shelves is stored within a memory communicatively coupled with the at least one processor.

3. The automated storage system of claim 1, wherein each rack of the pair of racks corresponds to a double sided rack that is configured to store the one or more objects at a front portion and a rear portion of the double sided rack.

4. The automated storage system of claim 3, wherein the front portion of the double sided rack allows one or more users to collect the one or more objects and the rear portion of the double sided rack allows the at least one inverted robotic arm to replenish the plurality of shelves of the pair of racks with the one or more objects stored within the at least one movable shelf.

5. The automated storage system of claim 1, wherein each of the plurality of trays is integrated with a sensor configured to detect a status of a respective tray of the plurality of trays, wherein each sensor corresponds to a radio frequency identification (RFID) sensor.

6. The automated storage system of claim 5, wherein the status of the one or more objects within the plurality of trays corresponds to a tray with the one or more objects or the tray without the one or more objects.

7. The automated storage system of claim 1, wherein the at least one robotic unit is configured to move along the pair of tracks from a first position proximate to a first end of the at least one end of the storage unit to a second position proximate to a second end of the at least one end of the storage unit.

8. The automated storage system of claim 7, wherein the at least one inverted robotic arm comprises at least one suction unit, wherein the at least one suction unit is configured to grip the one or more objects and/or a plurality of trays that contain the one or more objects.

9. The automated storage system of claim 1, wherein the plurality of sensors corresponds to a computer vision (CV) sensor having a control unit, wherein the CV sensor is configured to capture visual information of each of the plurality of shelves of the storage unit that is processed by the control unit to determine the status of each shelf of the plurality of shelves.

10. The automated storage system of claim 9, wherein the status of each shelf of the plurality of shelves corresponds to a shelf without the one or more objects or the shelf with the one or more objects.

11. The automated storage system of claim 10, wherein the at least one processor, upon determining the shelf without the one or more objects, is configured to control the at least one inverted robotic arm to place the one or more objects from the at least one movable shelf to the storage unit.

12. A method comprising:

determining, via each sensor of a plurality of sensors installed in proximity to or within each of a plurality of shelves, a status of a respective shelf of the plurality of shelves of each rack of a pair of racks of a storage unit having an opening on at least one end of the storage unit, wherein the storage unit comprises each of the plurality of shelves that are configured to store one or more objects and a pair of tracks coupled, directly or indirectly, to the pair of racks; and controlling, via at least one processor communicatively coupled to the plurality of sensors, at least one inverted robotic arm of at least one robotic unit to place the one or more objects from at least one movable shelf to a corresponding shelf of the plurality of shelves, based at least on the status of each shelf of the plurality of shelves, wherein the at least one movable shelf is configured to be positioned within the opening of the storage unit, and wherein the at least one robotic unit is movably coupled to the pair of tracks.

13. The method of claim 12, wherein each rack of the pair of racks corresponds to a double sided rack that is configured to store the one or more objects at a front portion and a rear portion of the double sided rack, wherein the front portion of the double sided rack allows one or more users to collect the one or more objects and the rear portion of the double sided rack allows the at least one inverted robotic arm to replenish the plurality of shelves of the pair of racks with the one or more objects stored within the at least one movable shelf.

14. The method of claim 12, wherein each shelf of the plurality of shelves of the pair of racks is assigned with a unique identity (ID) code, wherein the unique ID code for each of the plurality of shelves is stored within a memory communicatively coupled with the at least one processor.

15. The method of claim 12, wherein the plurality of sensors correspond to a computer vision (CV) sensor having a control unit, wherein the CV sensor is configured to capture visual information of each of the plurality of shelves of the storage unit that is processed by the control unit to determine the status of each shelf of the plurality of shelves, wherein the status of each shelf of the plurality of shelves corresponds to a shelf without the one or more objects or the shelf with the one or more objects.

16. The method of claim 15 further comprising controlling, via the at least one processor, the at least one inverted robotic arm to place the one or more objects from the at least one movable shelf to the storage unit, upon determining the shelf without the one or more objects.

17. The method of claim 12, wherein the at least one movable shelf having a plurality of trays configured to store the one or more objects, each of the plurality of trays is integrated with a sensor configured to detect a status of a respective tray of the plurality of trays, wherein each sensor corresponds to a radio frequency identification (RFID) sensor.

18. The method of claim 17, wherein the status of the one or more objects within the plurality of trays corresponds to a tray with the one or more objects or the tray without the one or more objects.

19. The method of claim 12 further comprising moving the at least one robotic unit along the pair of tracks from a first position proximate to a first end of the at least one end of the storage unit to a second position proximate to a second end of the storage unit.

20. The method of claim 19, wherein the at least one inverted robotic arm comprises at least one suction unit, wherein the at least one suction unit is configured to grip the one or more objects or a plurality of trays that contain the one or more objects.

* * * * *